(12) United States Patent
Sinsky (10) Patent No.: US 9,049,094 B2
(45) Date of Patent: Jun. 2, 2015

(54) GENERATION OF MULTILEVEL SIGNALS USING CORRELATIVE CODING

(71) Applicant: Jeffrey H. Sinsky, Marlboro, NJ (US)

(72) Inventor: Jeffrey H. Sinsky, Marlboro, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 141 days.

(21) Appl. No.: 13/675,202

(22) Filed: Nov. 13, 2012

(65) Prior Publication Data

US 2014/0133596 A1    May 15, 2014

(51) Int. Cl.
*H04L 25/49* (2006.01)
*H04L 25/497* (2006.01)

(52) U.S. Cl.
CPC .......... *H04L 25/4917* (2013.01); *H04L 25/497* (2013.01)

(58) Field of Classification Search
USPC .................. 375/286, 260, 299, 349, 347, 343
See application file for complete search history.

(56) References Cited

U.S. PATENT DOCUMENTS

| | | | |
|---|---|---|---|
| 3,882,485 A | 5/1975 | Bluestein et al. | |
| 5,412,691 A | 5/1995 | Ginzburg et al. | |
| 6,765,708 B2 | 7/2004 | Davies | |
| 7,050,493 B2 | 5/2006 | Wei | |
| 7,167,518 B2 | 1/2007 | Wei | |
| 7,508,882 B2 | 3/2009 | Adamiecki et al. | |
| 2002/0181708 A1* | 12/2002 | Seo et al. ...................... | 380/252 |
| 2005/0024253 A1 | 2/2005 | Adamiecki et al. | |

FOREIGN PATENT DOCUMENTS

GB    2217957 A    11/1989

OTHER PUBLICATIONS

Avlonitis, Nicholas. "Multi-valued Signalling for High Efficiency Optical Communication Systems," Thesis (Ph.D.), Imperial College London (University of London) 2005 (196 pages).
Kabal, Peter et al., "Partial-Response Signaling," IEEE Transactions on Communications, vol. COM-23, No. 9, Sep. 1975, pp. 921-934.
Lender, A., "Correlative Digital Communication Techniques," IEEE Transactions on Communication Technology, vol. 12, No. 4, Dec. 1964, pp. 128-135.
Lender, A., "The Duobinary Technique for High-Speed Data Transmission," IEEE Transactions on Communications and Electronics, vol. 82, May 15, 1963, pp. 214-218.
Sharad, Mrigank et al., "Half-Rate Duobinary Transmitter Architecture for Chip-to-Chip Interconnect Applications," Journal Analog Integrated Circuits and Signal Processing archive vol. 68 Issue 3, Sep. 2011, pp. 361-377.
Pasupathy, S., "Correlative Coding: A Bandwidth-Efficient Signaling Scheme," IEEE Communications Society Magazine, Jul. 20, 1977, pp. 1-11.

* cited by examiner

*Primary Examiner* — Kabir A Timory
(74) *Attorney, Agent, or Firm* — Mendelsohn, Drucker & Dunleavy, P.C.; Yuri Gruzdkov (57) ABSTRACT

Disclosed is a polybinary-signal generator in which correlative coding is applied to a plurality of fractional-bit-rate signals instead of being applied to a corresponding multiplexed full-bit-rate signal. The resulting coded fractional-bit-rate signals are variously delayed with respect to one another and then summed to generate a polybinary output signal. One beneficial feature of this architecture is that most circuit components of the polybinary-signal generator operate at the fractional bit rate, which helps to alleviate at least some of the technical difficulties associated with the design of radio-frequency circuits intended for relatively high bit rates. Another beneficial feature of this architecture is that the polybinary-signal generator also serves as a signal multiplexer.

21 Claims, 4 Drawing Sheets

GENERATION OF MULTILEVEL SIGNALS USING CORRELATIVE CODING

BACKGROUND

1. Field

The present disclosure relates to communication equipment and, more specifically but not exclusively, to equipment for generating multilevel signals, such as polybinary signals.

2. Description of the Related Art

This section introduces aspects that may help facilitate a better understanding of the invention(s). Accordingly, the statements of this section are to be read in this light and are not to be understood as admissions about what is in the prior art or what is not in the prior art.

Duobinary signaling was introduced in the 1960s and since then has found numerous applications in communication systems for transmitting data over wireline, wireless, and optical links. Polybinary signaling can be viewed as a generalization of duobinary signaling to an arbitrary number (s, a positive integer greater than two) of signal levels, with duobinary signaling corresponding to the case of s=3. However, circuits for generating polybinary signals for these and other applications are not yet sufficiently developed.

SUMMARY OF SOME SPECIFIC EMBODIMENTS

Disclosed herein are various embodiments of a polybinary-signal generator in which correlative coding is applied to a plurality of fractional-bit-rate signals instead of being applied to a corresponding multiplexed full-bit-rate signal. The resulting coded fractional-bit-rate signals are variously delayed with respect to one another and then summed to generate a polybinary output signal. One beneficial feature of this architecture is that most circuit components of the polybinary-signal generator operate at the fractional bit rate, which helps to alleviate at least some of the technical difficulties associated with the design of radio-frequency circuits intended for relatively high bit rates. Another beneficial feature of this architecture is that the polybinary-signal generator also serves as a signal multiplexer.

According to one embodiment, provided is an apparatus comprising a coder circuit having a plurality of input ports and a plurality of output ports and configured to: receive a plurality of binary input streams, with each being received at a respective one of the input ports; generate a plurality of coded binary streams, with each of said coded binary streams being generated from (i) a respective set of binary input streams from the plurality of binary input streams and (ii) a respective set of other coded binary streams from the plurality of coded binary streams; and apply each of the plurality of coded binary streams to a respective one of the plurality of output ports. The apparatus further comprises a set of delay elements, each coupled to a respective one of the plurality of output ports of the coder circuit and configured to apply a respective different time delay to a respective one of the coded binary streams; and an adder circuit configured to sum delayed coded binary streams received from the delay elements to generate a multilevel signal having N+1 signal levels, where N is a positive integer greater than two.

According to another embodiment, provided is an apparatus comprising a coder circuit having N input ports and N output ports, where N is a positive integer greater than two. The coder circuit comprises: N XOR gates, each having N input terminals and an output terminal; and N−1 flip-flops. For each of the N XOR gates, the output terminal is connected to a respective one of the N output ports of the coder circuit; one of the N input terminals is connected to a respective one of the N input ports of the coder circuit; and each of the other N−1 input terminals is connected, either directly or through a respective one of the N−1 flip-flops, to a respective one of the other N−1 output ports of the coder circuit.

BRIEF DESCRIPTION OF THE DRAWINGS

Other aspects, features, and benefits of various embodiments of the invention will become more fully apparent, by way of example, from the following detailed description and the accompanying drawings, in which.

DETAILED DESCRIPTION

Principles of duobinary signaling are explained, for example, in an article by A. Lender entitled "The Duobinary Technique for High-Speed Data Transmission," published in IEEE Transactions on Communications and Electronics, vol. 82 (May, 1963), pp. 214-218, which is incorporated herein by reference in its entirety. A duobinary signal is typically generated from a corresponding binary (e.g., non-return-to-zero, NRZ) signal. Although both signals carry the same information, the bandwidth of the duobinary signal can theoretically be reduced by a factor of two compared to that of the NRZ signal. Owing to their higher spectral efficiency and improved tolerance to chromatic dispersion, duobinary signals can provide certain advantages, e.g., when used in wavelength-division-multiplexed (WDM) optical transport systems.

Principles of polybinary signaling are explained, for example, in an article by A. Lender, entitled "Correlative Digital Communication Techniques," published in the 1964 International Convention Record, vol. 12, pt. 5, pp. 45-53, which is incorporated herein by reference in its entirety. One feature of polybinary signaling is that, as the number of signal levels increases, the concentration of spectral energy moves towards lower frequencies. This feature can be advantageous, e.g., for electrical backplanes with spectral nulls in the frequency response or for dense WDM links.

A polybinary signal can be generated, e.g., using the steps of (i) precoding a binary input signal by mapping it from binary to binary, and (ii) filtering the resulting precoded binary signal with a polybinary filter defined by the following z transform, H(z):

$$H(z)=1+z^1+z^2+\ldots+z^K \quad (1)$$

where K=s−2 and s is the number of signal levels in the polybinary signal; and $z^{-i}$ is an operator that produces the delay of i times the signaling interval. For a polybinary filter having the transfer function expressed by Eq. (1), the precoding operation is expressed by Eq. (2):

$$Y[k]=Y[k-1]\oplus Y[k-2]\oplus \ldots \oplus Y[k-(N-1)]\oplus X[k] \quad (2)$$

where k is the time-slot index; Y[j] is the precoded binary signal in the j-th time slot, where j can be k, k−1, k−2, … k−(N−1); N=s−1; X[k] is the binary input signal in the k-th time slot; and ⊕ denotes an exclusive-OR (XOR) operation. The precoding is directed at preventing error propagation at the receiver. Also note that, for a duobinary signal, s=3, K=1, and N=2.

Figure 1:
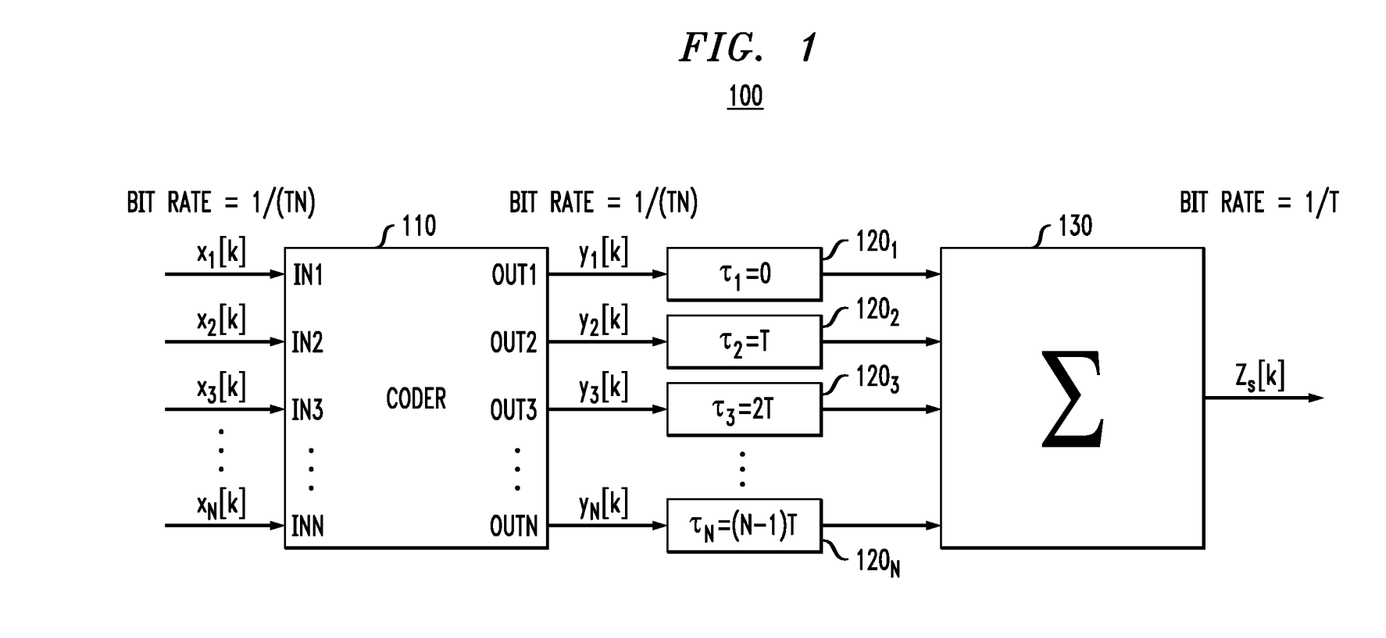
FIG. 1 shows a block diagram of a polybinary-signal generator according to one embodiment of the disclosure.

FIG. 1 shows a block diagram of a polybinary-signal generator 100 according to one embodiment of the disclosure. Generator 100 operates to convert N parallel binary data streams $x_1[k]$-$x_N[k]$ into a polybinary signal, $Z_s[k]$, having s(=N+1) signal levels. Each of binary data streams $x_1[k]$-$x_N[k]$ has a bit rate of 1/(NT), and polybinary signal $Z_s[k]$ has a bit rate of 1/T, where NT is a bit duration (signaling interval) in each of data streams $x_1[k]$-$x_N[k]$.

As will become apparent from the description that follows, one beneficial feature of generator 100 is that most of its circuit components operate at the fractional bit rate of 1/(NT), with the conversion of the fractional-bit-rate signals into the full-bit-rate (1/T) polybinary signal being performed substantially at the output port of the generator. One of ordinary skill in the art will appreciate that, for relatively high full bit rates, e.g., on the order of 100 Gbit/s, technical and commercial challenges to designing a practical full-bit-rate circuit are significantly more severe than those to designing a practical fractional-bit-rate circuit. Another beneficial feature of polybinary-signal generator 100 is that it also serves as an N-to-1 signal multiplexer.

Generator 100 includes an (N×N)-port coder circuit 110 configured to transform binary data streams $x_1[k]$-$x_N[k]$, through correlative coding, into coded binary data streams $y_1[k]$-$y_N[k]$. More specifically, each of data streams $x_1[k]$-$x_N[k]$ is applied to a respective one of input ports IN1-INN of coder circuit 110. Each of data streams $y_1[k]$-$y_N[k]$ is generated at a respective one of output ports OUT1-OUTN of coder circuit 110. The correlative coding applied by coder circuit 110 in the process of converting data streams $x_1[k]$-$x_N[k]$ into data streams $y_1[k]$-$y_N[k]$ is defined by Eqs. (3a)-(3e):

$$y_N[k] = y_{N-1}[k] \oplus y_{N-2}[k] \oplus \ldots \oplus y_1[k] \oplus x_N[k] \quad (3a)$$

$$y_{N-1}[k] = y_{N-2}[k] \oplus y_{N-3}[k] \oplus \ldots \oplus y_1[k] \oplus y_N[k-1] \oplus x_{N-1}[k] \quad (3b)$$

$$y_{N-2}[k] = \\ y_{N-3}[k] \oplus y_{N-4}[k] \oplus \ldots \oplus y_1[k] \oplus y_N[k-1] \oplus y_{N-1}[k-1] \oplus x_{N-2}[k] \quad (3c)$$

$$y_{N-3}[k] = y_{N-4}[k] \oplus y_{N-5}[k] \oplus \ldots \oplus y_1[k] \oplus \\ y_N[k-1] \oplus y_{N-1}[k-1] \oplus y_{N-2}[k-1] \oplus x_{N-3}[k] \quad (3d)$$

...

$$y_1[k] = \\ y_N[k-1] \oplus y_{N-1}[k-1] \oplus y_{N-2}[k-1] \oplus \ldots \oplus y_2[k-1] \oplus x_1[k] \quad (3e)$$

Note that, similar to data streams $x_1[k]$-$x_N[k]$, each of data streams $y_1[k]$-$y_N[k]$ has a bit rate of 1/(NT).

Generator 100 further includes N delay elements $120_1$-$120_N$, each coupled to a respective one of output ports OUT1-OUTN of coder circuit 110 and configured to transmit, with appropriate time delay, a respective one of data streams $y_1[k]$-$y_N[k]$ to a signal adder (Σ) 130. The relative time delays imposed by delay elements $120_1$-$120_N$ are given by Eq. (4):

$$\tau_m = (m-1)T \quad (4)$$

where $\tau_m$ is the relative time delay imposed by delay element $120_m$, and m=1, 2, ..., N. In one embodiment, delay elements $120_1$-$120_N$ can be implemented using a set of transmission lines of different respective lengths. In an alternative embodiment, delay elements $120_1$-$120_N$ can be implemented using a set of D (digital or data) flip-flops, each with a respective clock delay indicated by Eq. (4).

Signal adder 130 is configured to sum the signals received from delay elements $120_1$-$120_N$, thereby generating polybinary signal $Z_s[k]$. In one embodiment, signal adder 130 can be implemented as an analog device, which can be active or passive in construction. For relatively high full data rates, e.g., on the order of 100 Gbit/s, the circuit implementing signal adder 130 is impedance matched to its input and output lines and also configured to provide sufficient degree of isolation (e.g., relatively low crosstalk) between its input ports.

It can be proved by recursion, starting from the case corresponding to duobinary signaling, that output signal $Z_s[k]$ generated in generator 100 as described above has the same mathematical properties as a polybinary signal generated by the steps of: (i) multiplexing data streams $x_1[k]$-$x_N[k]$ to generate a corresponding multiplexed data stream, X[k], having a bit rate of 1/T; (ii) subjecting data stream X[k] to precoding processing described by Eq. (2) to generate a corresponding precoded data stream, Y[k]; and (iii) subjecting precoded data stream Y[k] to z transform H(z) expressed by Eq. (1).

In various embodiments, polybinary-signal generator 100 can be used in an electrical modem configured to transmit modulated electrical signals via a wireline link or in an optical transmitter configured to transmit modulated optical signals via a fiberoptic link. In the latter application, generator 100 can be a part of a driver circuit configured to drive an optical modulator. Other applications (e.g., wireless) of polybinary-signal generator 100 are also possible.

In one embodiment, polybinary-signal generator 100 may include a de-multiplexer (not explicitly shown in FIG. 1) located upstream of coder circuit 110 and configured to generate data streams $x_1[k]$-$x_N[k]$ by de-multiplexing a binary input data stream having a bit rate of 1/T. In this embodiment, polybinary-signal generator 100 operates by (i) de-multiplexing this input data stream to generate data streams $x_1[k]$-$x_N[k]$, (ii) coding data streams $x_1[k]$-$x_N[k]$ to generate coded data streams $y_1[k]$-$y_N[k]$, and (iii) multiplexing coded data streams $y_1[k]$-$y_N[k]$ to generate polybinary signal $Z_s[k]$. Step (iii) is performed by variously delaying coded data streams $y_1[k]$-$y_N[k]$ and then summing the resulting variously delayed data streams, e.g., as indicated in FIG. 1.

Figure 2:
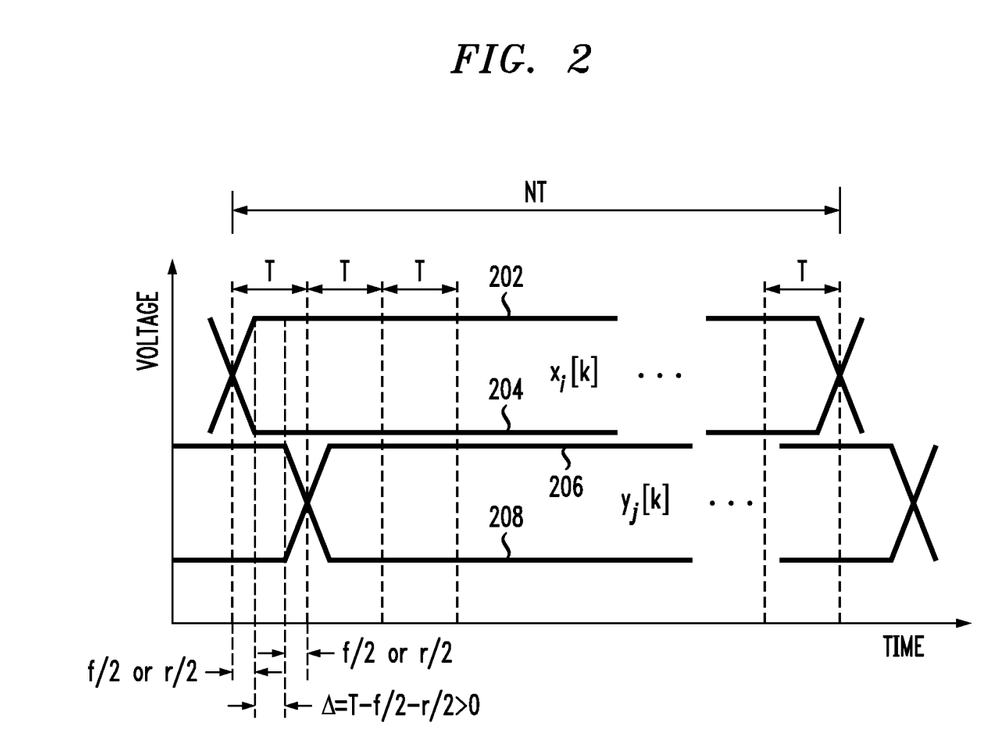
FIG. 2 graphically shows representative signal waveforms that can be used in the polybinary-signal generator of FIG. 1 according to one embodiment of the disclosure.

FIG. 2 graphically shows representative signal waveforms that can be used in polybinary-signal generator 100 (FIG. 1) according to one embodiment of the disclosure. More specifically, FIG. 2 shows four waveforms, labeled 202, 204, 206, and 208, respectively. Middle portions of waveforms 202 and 204 correspond to a "one" and a "zero," respectively, in a signal representing input data stream $x_i[k]$. Middle portions of waveforms 206 and 208 similarly correspond to a "one" and a "zero," respectively, in a signal representing coded data stream $y_j[k]$. Note that waveforms 202 and 204 are vertically offset with respect to waveforms 206 and 208, by an arbitrary voltage, for clarity. For illustration purposes, in waveforms 202 and 206, the binary "one" is shown as being preceded and followed by a binary "zero." Similarly, in waveforms 204 and 208, the binary "zero" is shown as being preceded and followed by a binary "one." One of ordinary skill in the art will understand that waveforms representing other bit sequences are also possible.

Each binary "one" and binary "zero" in waveforms 202-208 has an approximate duration of NT, which results in a bit rate of 1/(NT). The leading and trailing edges of a pulse representing a binary "one" in each of waveforms 202-208 have approximate durations of r and f (e.g., microseconds), respectively, as indicated by vertical dashed lines in FIG. 2.

Since waveforms 202-208 are used in polybinary-signal generator 100 for the generation of polybinary signal $Z_s[k]$, which has a bit rate of 1/T, it is beneficial when they have pulses whose leading and trailing edges are sufficiently steep, e.g., as quantified by Eq. (4):

$$T-(f+r)/2>0 \qquad (4)$$

One of ordinary skill in the art will appreciate that the use of waveforms that satisfy Eq. (4) is beneficial, e.g., because it helps to achieve sufficiently wide-open eyes in the eye diagram corresponding to polybinary signal $Z_s[k]$.

Figure 3:
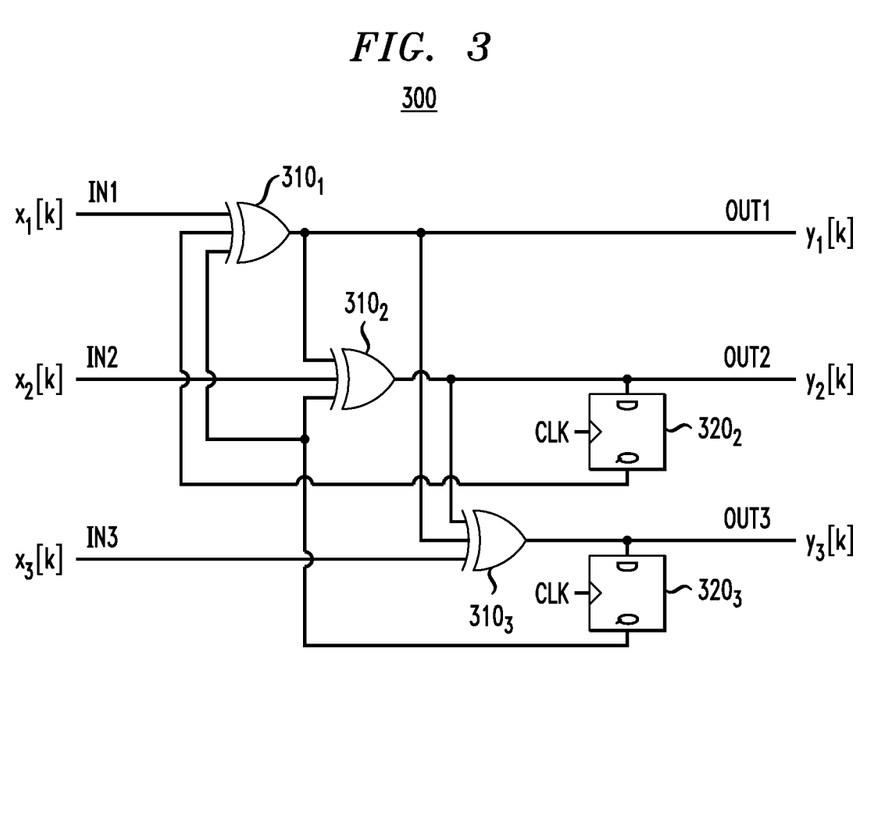
FIG. 3 shows a circuit diagram of a (3×3)-port coder circuit that can be used in the polybinary-signal generator of FIG. 1 according to one embodiment of the disclosure.

FIG. 3 shows a circuit diagram of a (3×3)-port coder circuit 300 that can be used as coder circuit 110 (FIG. 1) according to one embodiment of the disclosure. More specifically, coder circuit 300 can be used in an embodiment of polybinary-signal generator 100 designed to generate a four-level (s=4) polybinary signal ($Z_4[k]$) and, as such, corresponds to N=3. Coder circuit 300 comprises three XOR gates $310_1$-$310_3$ and two D flip-flops $320_2$ and $320_3$, connected to one another and to input ports IN1-IN3 and output ports OUT1-OUT3 of the coder circuit as indicated in FIG. 3. D flip-flops $320_2$ and $320_3$ are controlled by a clock signal (CLK) having a rate of 1/(NT).

XOR gate $310_1$ is configured to receive three input signals. In a k-th time slot, the first input signal has a value of $x_1[k]$ because it is received directly from input port IN1. The second input signal has a value of $y_2[k-1]$ because it is a copy of coded binary signal $y_2[k]$ received from output port OUT2 after being delayed by one clock cycle in D flip-flop $320_2$. The third input signal has a value of $y_3[k-1]$ because it is a copy of coded binary signal $y_3[k]$ received from output port OUT3 after being delayed by one clock cycle in D flip-flop $320_3$. XOR gate $310_1$ generates coded binary signal $y_1[k]$ at output port OUT1 by applying a corresponding XOR transformation to these three input signals. Therefore, coded binary signal $y_1[k]$ generated by coder circuit 300 can be expressed by Eq. (5):

$$y_1[k]=y_3[k-1]\oplus y_2[k-1]\oplus x_1[k] \qquad (5)$$

Comparison of Eqs. (5) and (3e) reveals that the former is the same as the latter, if the latter is rewritten for the specific case of N=3.

XOR gate $310_2$ is also configured to receive three input signals. In a k-th time slot, the first input signal has a value of $y_1[k]$ because it is received directly from output port OUT1. The second input signal has a value of $x_2[k]$ because it is received directly from input port IN2. The third input signal has a value of $y_3[k-1]$ because it is a copy of coded binary signal $y_3[k]$ received from output port OUT3 after being delayed by one clock cycle in D flip-flop $320_3$. XOR gate $310_2$ generates coded binary signal $y_2[k]$ at output port OUT2 by applying a corresponding XOR transformation to these three input signals. Therefore, coded binary signal $y_2[k]$ generated by coder circuit 300 can be expressed by Eq. (6):

$$y_2[k]=y_1[k]\oplus y_3[k-1]\oplus x_2[k] \qquad (6)$$

Comparison of Eqs. (6) and (3b) reveals that the former is the same as the latter, if the latter is rewritten for the specific case of N=3.

XOR gate $310_3$ is also configured to receive three input signals. In a k-th time slot, the first input signal has a value of $y_2[k]$ because it is received directly from output port OUT2. The second input signal has a value of $y_1[k]$ because it is received directly from output port OUT1. The third input signal has a value of $x_3[k]$ because it is received directly from input port IN3. XOR gate $310_3$ generates coded binary signal $y_3[k]$ at output port OUT3 by applying a corresponding XOR transformation to these three input signals. Therefore, coded binary signal $y_3[k]$ generated by coder circuit 300 can be expressed by Eq. (7):

$$y_3[k]=y_2[k]\oplus y_1[k]\oplus x_3[k] \qquad (7)$$

Comparison of Eqs. (7) and (3a) reveals that the former is the same as the latter, if the latter is rewritten for the specific case of N=3.

Figure 4:
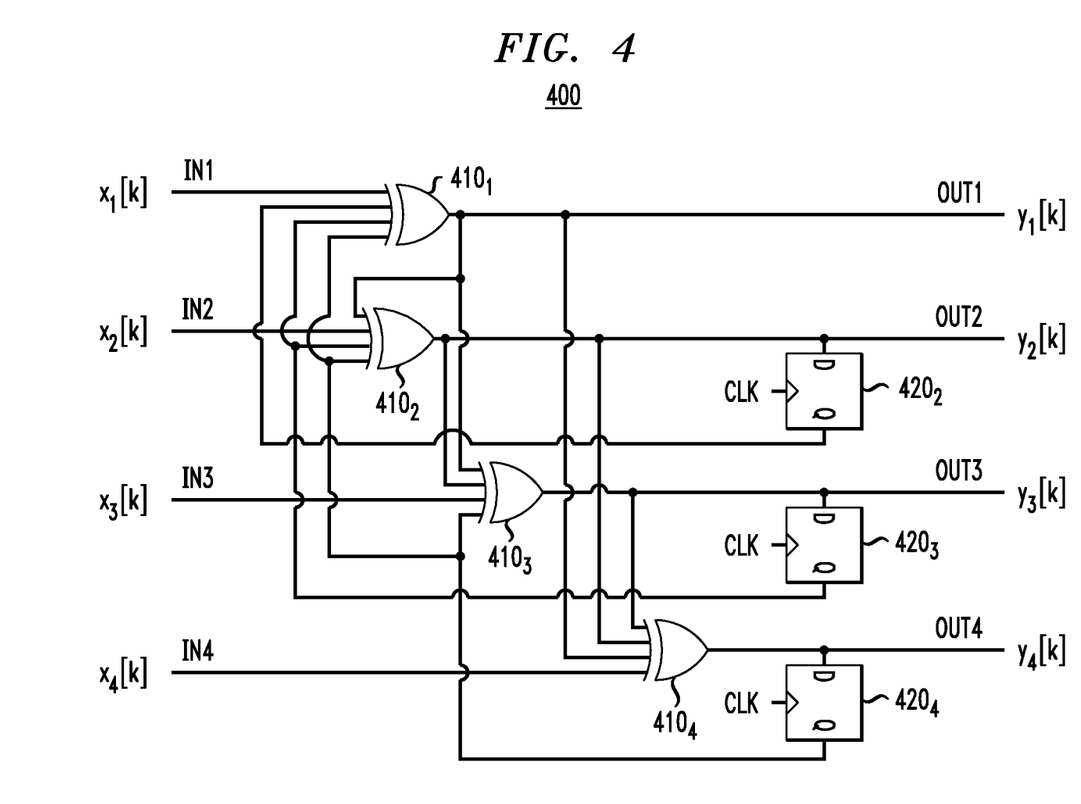
FIG. 4 shows a circuit diagram of a (4×4)-port coder circuit that can be used in the polybinary-signal generator of FIG. 1 according to another embodiment of the disclosure.

FIG. 4 shows a circuit diagram of a (4×4)-port coder circuit 400 that can be used as coder circuit 110 (FIG. 1) according to another embodiment of the disclosure. More specifically, coder circuit 400 can be used in an embodiment of polybinary-signal generator 100 designed to generate a five-level (s=5) polybinary signal ($Z_5[k]$) and, as such, corresponds to N=4. Coder circuit 400 comprises four XOR gates $410_1$-$410_4$ and three D flip-flops $420_2$-$420_4$, connected to one another and to input ports IN1-IN4 and output ports OUT1-OUT4 of the coder circuit as indicated in FIG. 4. D flip-flops $420_2$-$420_4$ are controlled by a clock signal (CLK) having a rate of 1/(NT).

XOR gate $410_1$ is configured to receive four input signals. In a k-th time slot, the first input signal has a value of $x_1[k]$ because it is received directly from input port IN1. The second input signal has a value of $y_2[k-1]$ because it is a copy of coded binary signal $y_2[k]$ received from output port OUT2 after being delayed by one clock cycle in D flip-flop $420_2$. The third input signal has a value of $y_3[k-1]$ because it is a copy of coded binary signal $y_3[k]$ received from output port OUT3 after being delayed by one clock cycle in D flip-flop $420_3$. The fourth input signal has a value of $y_4[k-1]$ because it is a copy of coded binary signal $y_4[k]$ received from output port OUT4 after being delayed by one clock cycle in D flip-flop $420_4$. XOR gate $410_1$ generates coded binary signal $y_1[k]$ at output port OUT1 by applying a corresponding XOR transformation to these four input signals. Therefore, coded binary signal $y_1[k]$ generated by coder circuit 400 can be expressed by Eq. (8):

$$y_1[k]=y_4[k-1]\oplus y_3[k-1]\oplus y_2[k-1]\oplus x_1[k] \qquad (8)$$

Comparison of Eqs. (8) and (3e) reveals that the former is the same as the latter, if the latter is rewritten for the specific case of N=4.

XOR gate $410_2$ is also configured to receive four input signals. In a k-th time slot, the first input signal has a value of $y_1[k]$ because it is received directly from output port OUT1. The second input signal has a value of $x_2[k]$ because it is received directly from input port IN2. The third input signal has a value of $y_3[k-1]$ because it is a copy of coded binary signal $y_3[k]$ received from output port OUT3 after being delayed by one clock cycle in D flip-flop $420_3$. The fourth input signal has a value of $y_4[k-1]$ because it is a copy of coded binary signal $y_4[k]$ received from output port OUT4 after being delayed by one clock cycle in D flip-flop $420_4$. XOR gate $410_2$ generates coded binary signal $y_2[k]$ at output port OUT2 by applying a corresponding XOR transformation to these four input signals. Therefore, coded binary signal $y_2[k]$ generated by coder circuit 400 can be expressed by Eq. (9):

$$y_2[k]=y_1[k]\oplus y_4[k-1]\oplus y_3[k-1]\oplus x_2[k] \qquad (9)$$

Comparison of Eqs. (9) and (3c) reveals that the former is the same as the latter, if the latter is rewritten for the specific case of N=4.

XOR gate $410_3$ is also configured to receive four input signals. In a k-th time slot, the first input signal has a value of $y_1[k]$ because it is received directly from output port OUT1.

The second input signal has a value of $y_2[k]$ because it is received directly from output port OUT2. The third input signal has a value of $x_3[k]$ because it is received directly from input port IN3. The fourth input signal has a value of $y_4[k-1]$ because it is a copy of coded binary signal $y_4[k]$ received from output port OUT4 after being delayed by one clock cycle in D flip-flop $420_4$. XOR gate $410_3$ generates coded binary signal $y_3[k]$ at output port OUT3 by applying a corresponding XOR transformation to these four input signals. Therefore, coded binary signal $y_3[k]$ generated by coder circuit 400 can be expressed by Eq. (10):

$$y_3[k]=y_2[k]\oplus y_1[k]\oplus y_4[k-1]\oplus x_3[k] \quad (10)$$

Comparison of Eqs. (10) and (3b) reveals that the former is the same as the latter, if the latter is rewritten for the specific case of N=4.

XOR gate $410_4$ is also configured to receive four input signals. In a k-th time slot, the first input signal has a value of $y_3[k]$ because it is received directly from output port OUT3. The second input signal has a value of $y_2[k]$ because it is received directly from output port OUT2. The third input signal has a value of $y_1[k]$ because it is received directly from output port OUT1. The fourth input signal has a value of $x_4[k]$ because it is received directly from input port IN4. XOR gate $410_4$ generates coded binary signal $y_4[k]$ at output port OUT4 by applying a corresponding XOR transformation to these four input signals. Therefore, coded binary signal $y_4[k]$ generated by coder circuit 400 can be expressed by Eq. (11):

$$y_4[k]=y_3[k]\oplus y_2[k]\oplus y_1[k]\oplus x_4[k] \quad (11)$$

Comparison of Eqs. (11) and (3a) reveals that the former is the same as the latter, if the latter is rewritten for the specific case of N=4.

Based on the above-provided description of coder circuits 300 (FIG. 3) and 400 (FIG. 4) and also based on Eqs. (3a)-(3e), one of ordinary skill in the art will be able to make and use, without undue experimentation, an (M×M)-port coder circuit for generating an (M+1)-level polybinary signal in a corresponding embodiment of polybinary-signal generator 100 (FIG. 1), where M is an arbitrary integer greater than two. For reasons related to circuit-implementation complexity, the value of M may have an upper limit of about 100, e.g., 128. In one embodiment, such a coder circuit has M input ports and M output ports and also includes: (i) M XOR gates, each having M input terminals and an output terminal, and (ii) M−1 D flip-flops. For each of the M XOR gates, the output terminal is connected to a respective one of the M output ports. One of the M input terminals is connected to a respective one of the M input ports. Each of the other M−1 input terminals is connected, either directly or through a respective one of the M−1 D flip-flops, to a respective one of the other M−1 output ports so that each of the M XOR gates has a different respective number of said other M−1 input terminals connected directly to the output ports, with said different respective numbers ranging from zero to M−1. In various alternative embodiments, a D flip-flop can be replaced by a memory cell, a zero-order hold element, or a delay line.

One of ordinary skill in the art will understand that an XOR gate having more than two input terminals is designed to operate as if the input signals received at those input terminals are being processed using a series of conventional Boolean XOR operations, such that: (i) the first two input signals are fed into a first two-input XOR gate; (ii) the output signal generated by the first two-input XOR gate and the third input signal are fed into a second two-input XOR gate; (iii) the output signal generated by the second two-input XOR gate and the fourth input signal are fed into a third two-input XOR gate; and so on for any number of remaining input signals. A two-input XOR gate has two input terminals and one output terminal and is configured to generate an output signal on the output terminal by applying a conventional Boolean XOR operation to the two input signals received on the two input terminals. A conventional Boolean XOR operation is a type of logical disjunction on two operands that results in a value of "true" if exactly one of the operands has a value of "true." The XOR gate with more than two input terminals thus generates a binary "one" at its output terminal when the number of binary "ones" received at the input terminals is odd, and a binary "zero" when the number of binary "ones" received at the input terminals is even. In view of this property, in various alternative embodiments, an XOR gate having more than two input terminals in a coder circuit (e.g., 300 or 400) can be replaced by a parity-check circuit or by a modulo-2 adder.

While this invention has been described with reference to illustrative embodiments, this description is not intended to be construed in a limiting sense.

Although embodiments of generator 100 (FIG. 1) have been described in reference to correlative coding corresponding to an s-level polybinary signal, the contemplated embodiments are not so limited. More specifically, the signal-processing architecture exemplified by the disclosed circuit structure of generator 100 can be used to similarly implement other types of correlative coding and/or partial-response signaling directed at generating multilevel signals that are not necessarily polybinary signals. Examples of such other types of correlative coding and/or partial-response signaling are disclosed, e.g., in (i) A. Lender, "Correlative Digital Communication Techniques," IEEE Transactions on Communication Technology, vol. 12, no. 4, pp. 128-135, December 1964; (ii) S. Pasupathy, "Correlative Coding: A Bandwidth-Efficient Signaling Scheme," IEEE Communications Society Magazine, July 1977; and (iii) P. Kabal, S. Pasupathy, "Partial-Response Signaling," IEEE Transactions on Communications, vol. 23, no. 9, September 1975. These three publications are incorporated herein by reference in their entirety.

Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Also, for purposes of this description, it is understood that all gates are powered from a fixed-voltage power domain (or domains) and ground unless shown otherwise. Accordingly, all digital signals generally have voltages that range from approximately ground potential to that of one of the power domains and transition (slew) quickly. However and unless stated otherwise, ground may be considered a power source having a voltage of approximately zero volts, and a power source having any desired voltage may be substituted for ground. Therefore, all gates may be powered by at least two power sources, with the attendant digital signals therefrom having voltages that range between the approximate voltages of the power sources.

The present inventions may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

The drawings merely illustrate some specific embodiments of the invention. Furthermore, all examples recited herein are principally intended expressly to be only for pedagogical purposes to aid the reader in understanding the principles of the invention(s) and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

What is claimed is:

1. An apparatus comprising:
   a coder circuit having a plurality of input ports and a plurality of output ports and configured to:
      receive a plurality of binary input streams, with each being received at a respective one of the plurality of input ports;
      generate a plurality of coded binary streams, with each of said coded binary streams being generated from a respective set of binary input streams from the plurality of binary input streams and a respective set of other coded binary streams from the plurality of coded binary streams; and
      apply each of the plurality of coded binary streams to a respective one of the plurality of output ports;
   a set of delay elements, each coupled to a respective one of the plurality of output ports of the coder circuit and configured to apply a respective time delay to a respective one of the coded binary streams; and
   an adder circuit configured to sum delayed coded binary streams received from the set of delay elements to generate a multilevel signal having N+1 signal levels, where N is a positive integer greater than two; and
   wherein the apparatus is configured to operate such that:
      each of the binary input streams has a bit rate of 1/NT, where NT is a bit duration in the binary input streams; and
      the multilevel signal has a bit rate of 1/T.

2. The apparatus of claim 1, wherein:
   the plurality of binary input streams comprises N binary input streams;
   the plurality of coded binary streams comprises N coded binary streams;
   the respective set of binary input streams comprises a respective one of the N binary input streams; and
   the respective set of other coded binary streams comprises respective N−1 of the N coded binary streams.

3. The apparatus of claim 1, wherein:
   each delay element from the set of delay elements is configured to apply a time delay that is different from a time delay applied by any other delay element from the set of delay elements; and
   any two delay elements in the set of delay elements have time delays that differ from one another by a value that is smaller than a bit duration in the coded binary streams.

4. The apparatus of claim 1, further comprising a de-multiplexer configured to generate the plurality of binary input streams by de-multiplexing a binary data stream having a higher bit rate than any of the plurality of the binary input streams.

5. The apparatus of claim 1, wherein the coder circuit is configured to mix the respective sets using a type of correlative coding that causes the multilevel signal to be a polybinary signal.

6. The apparatus of claim 1, wherein the apparatus is further configured to operate so that each of the coded binary streams has the bit rate of 1/NT.

7. The apparatus of claim 1, wherein each of the plurality of input ports and the plurality of output ports has N ports.

8. The apparatus of claim 7, wherein N is smaller than 129.

9. The apparatus of claim 7, wherein N=3.

10. The apparatus of claim 9, wherein the coder circuit is configured to generate a first coded binary stream, $y_1[k]$, a second coded binary stream, $y_2[k]$, and a third coded binary stream, $y_3[k]$, of the plurality of coded binary streams in accordance with the following equations:

$$y_1[k]=y_3[k-1]y_2[k-1]x_1[k];$$

$$y_2[k]=y_1[k]y_3[k-1]x_2[k];$$

$$y_3[k]=y_2[k]y_1[k]x_3[k],$$

where k is a time-slot index; $x_1[k]$ is a first of the plurality of binary input streams; $x_2[k]$ is a second of the plurality of binary input streams; and $x_3[k]$ is a third of the plurality of binary input streams.

11. The apparatus of claim 7, wherein N=4.

12. The apparatus of claim 11, wherein the coder circuit is configured to generate a first coded binary stream, $y_1[k]$, a second coded binary stream, $y_2[k]$, a third coded binary stream, $y_3[k]$, and a fourth coded binary stream, $y_4[k]$, of the plurality of coded binary streams in accordance with the following equations:

$$y_1[k]=y_4[k-1]y_3[k-1]y_2[k-1]x_1[k];$$

$$y_2[k]=y_1[k]y_4[k-1]y_3[k-1]x_2[k];$$

$$y_3[k]=y_2[k]y_1[k]y_4[k-1]x_3[k];$$

$$y_4[k]=y_3[k]y_2[k]y_1[k]x_4[k],$$

where k is a time-slot index; $x_1[k]$ is a first of the plurality of binary input streams; $x_2[k]$ is a second of the plurality of binary input streams; $x_3[k]$ is a third of the plurality of binary input streams; and $x_4[k]$ is a fourth of the plurality of binary input streams.

13. The apparatus of claim 7, wherein the set of delay elements comprises N delay elements, each having a different relative time delay selected from a set of values consisting of $0, T, 2T, \ldots, [N-1]T$, where NT is a bit duration in the binary input streams.

14. The apparatus of claim 7, wherein:
the coder circuit comprises:
N XOR gates, each having N input terminals and an output terminal; and
N−1 flip-flops; and
for each of the N XOR gates,
the output terminal is connected to a respective one of the N output ports of the coder circuit;
one of the N input terminals is connected to a respective one of the N input ports of the coder circuit; and
each of other N−1 input terminals of the N input terminals is connected, either directly or through a respective one of the N−1 flip-flops, to a respective one of other N−1 output ports of the coder circuit.

15. The apparatus of claim 14, wherein each of the N XOR gates has a different respective number of said other N−1 input terminals connected directly to the output ports, with said different respective numbers selected from a set consisting of 0, 1, 2, . . . , N−1.

16. The apparatus of claim 14, wherein the flip-flops are controlled by a clock signal having a rate of 1/NT, where NT is a bit duration in the binary input streams.

17. An apparatus comprising a coder circuit having N input ports and N output ports, where N is a positive integer greater than two, wherein:
the coder circuit comprises:
N XOR gates, each having N input terminals and an output terminal; and
N−1 flip-flops; and
for each of the N XOR gates,
the output terminal is connected to a respective one of the N output ports of the coder circuit;
one of the N input terminals is connected to a respective one of the N input ports of the coder circuit; and
each of other N−1 input terminals of the N input terminals is connected, either directly or through a respective one of the N−1 flip-flops, to a respective one of other N−1 output ports of the coder circuit.

18. The apparatus of claim 17, wherein each of the N XOR gates has a respective number of said other N−1 input terminals connected directly to the output ports, with said respective numbers selected from a set consisting of 0, 1, 2, . . . , N−1.

19. The apparatus of claim 17, wherein the flip-flops are controlled by a clock signal having a rate of 1/NT, where NT is a bit duration in the binary input streams.

20. An apparatus comprising:
a coder circuit having a plurality of input ports and a plurality of output ports and configured to:
receive a plurality of binary input streams, with each being received at a respective one of the plurality of input ports;
generate a plurality of coded binary streams, with each of said coded binary streams being generated from a respective set of binary input streams from the plurality of binary input streams and a respective set of other coded binary streams from the plurality of coded binary streams; and
apply each of the plurality of coded binary streams to a respective one of the plurality of output ports;
a set of delay elements, each coupled to a respective one of the plurality of output ports of the coder circuit and configured to apply a respective time delay to a respective one of the coded binary streams; and
an adder circuit configured to sum delayed coded binary streams received from the set of delay elements to generate a multilevel signal having N+1 signal levels, where N is a positive integer greater than two, wherein:
each delay element from the set of delay elements is configured to apply a time delay that is different from a time delay applied by any other delay element from the set of delay elements; and
any two delay elements in the set of delay elements have time delays that differ from one another by a value that is smaller than a bit duration in the coded binary streams.

21. An apparatus comprising:
a coder circuit having a plurality of input ports and a plurality of output ports and configured to:
receive a plurality of binary input streams, with each being received at a respective one of the plurality of input ports;
generate a plurality of coded binary streams, with each of said coded binary streams being generated from a respective set of binary input streams from the plurality of binary input streams and a respective set of other coded binary streams from the plurality of coded binary streams; and
apply each of the plurality of coded binary streams to a respective one of the plurality of output ports;
a set of delay elements, each coupled to a respective one of the plurality of output ports of the coder circuit and configured to apply a respective time delay to a respective one of the coded binary streams; and
an adder circuit configured to sum delayed coded binary streams received from the set of delay elements to generate a multilevel signal having N+1 signal levels, where N is a positive integer greater than two; and
wherein the coder circuit is configured to mix the respective sets using a type of correlative coding that causes the multilevel signal to be a polybinary signal.

* * * * *